(12) United States Patent
Philibin

(10) Patent No.: US 11,564,781 B2
(45) Date of Patent: Jan. 31, 2023

(54) HEALING ABUTMENT SYSTEM FOR CONFIGURING CROWN ABUTMENTS AT AN IMPLANT SITE

(71) Applicant: Terry B. Philibin, Vienna, OH (US)

(72) Inventor: Terry B. Philibin, Vienna, OH (US)

( * ) Notice: Subject to any disclaimer, the term of this patent is extended or adjusted under 35 U.S.C. 154(b) by 482 days.

(21) Appl. No.: 16/552,358

(22) Filed: Aug. 27, 2019

(65) Prior Publication Data
US 2020/0146784 A1 May 14, 2020

Related U.S. Application Data

(63) Continuation of application No. 16/292,775, filed on Mar. 5, 2019.

(60) Provisional application No. 62/793,609, filed on Jan. 17, 2019, provisional application No. 62/760,985, filed on Nov. 14, 2018.

(51) Int. Cl.
*A61C 8/00* (2006.01)

(52) U.S. Cl.
CPC .............. *A61C 8/008* (2013.01); *A61C 8/005* (2013.01); *A61C 8/0022* (2013.01)

(58) Field of Classification Search
CPC ........ A61C 8/005; A61C 8/008; A61C 8/0022
USPC .................................................. 433/172–176
See application file for complete search history.

(56) References Cited

U.S. PATENT DOCUMENTS

| | | | |
|---|---|---|---|
| 5,237,998 A | 8/1993 | Duret et al. | |
| 5,857,853 A | 1/1999 | van Nifterick et al. | |
| 6,402,707 B1 | 6/2002 | Ernst | |
| 8,382,477 B2 | 2/2013 | Philibin | |
| 8,586,610 B2 | 11/2013 | Wolfgang et al. | |
| 8,628,327 B1 | 1/2014 | Blaisdell et al. | |
| 9,572,640 B2 | 2/2017 | Blaisdell et al. | |
| 9,895,209 B2 | 2/2018 | Blaisdell et al. | |
| 10,016,260 B2 | 7/2018 | Blaisdell et al. | |
| 2012/0264081 A1* | 10/2012 | Philibin | A61C 8/0006 433/173 |
| 2013/0177872 A1 | 7/2013 | Blaisdell et al. | |
| 2013/0196290 A1* | 8/2013 | Herrington | A61C 8/0001 433/173 |
| 2013/0296813 A2* | 11/2013 | Park | A61C 8/008 604/318 |
| 2014/0124969 A1 | 5/2014 | Blaisdell et al. | |
| 2014/0319713 A1 | 10/2014 | Blaisdell et al. | |
| 2015/0004563 A1 | 1/2015 | Blaisdell et al. | |
| 2016/0262852 A1* | 9/2016 | Marlin | A61B 6/032 |
| 2017/0007372 A1* | 1/2017 | Blaisdell | A61C 8/0001 |
| 2017/0172714 A1 | 6/2017 | Blaisdell et al. | |
| 2018/0161134 A1 | 6/2018 | Liston et al. | |
| 2018/0228578 A1* | 8/2018 | Liston | A61C 8/008 |
| 2018/0325630 A1* | 11/2018 | Leger | A61C 9/004 |
| 2018/0368949 A1* | 12/2018 | Suttin | A61C 13/0835 |

* cited by examiner

*Primary Examiner* — Matthew M Nelson
(74) *Attorney, Agent, or Firm* — Robert G. Lev

(57) ABSTRACT

An anatomical healing abutment is configured to connect to a dental implant. The healing abutment has a body portion which includes at least three reference marks that provide data to orient the connection axis of the abutment with the that of the dental implant so that certain conventional steps, including healing abutment manipulation, multiple scans, and the taking of impressions, can be eliminated, thereby saving time and effort on the part of the practitioner.

9 Claims, 18 Drawing Sheets

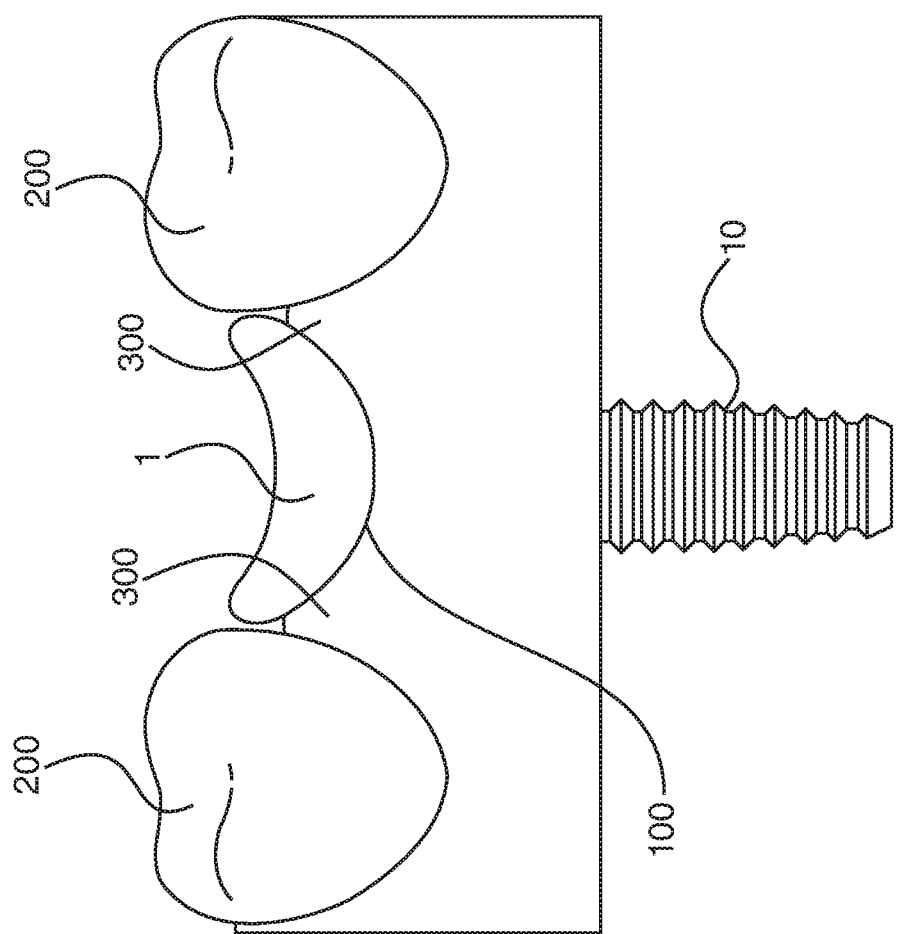

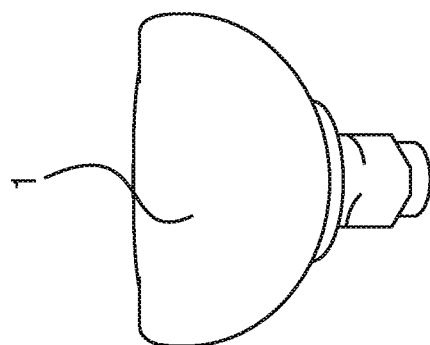
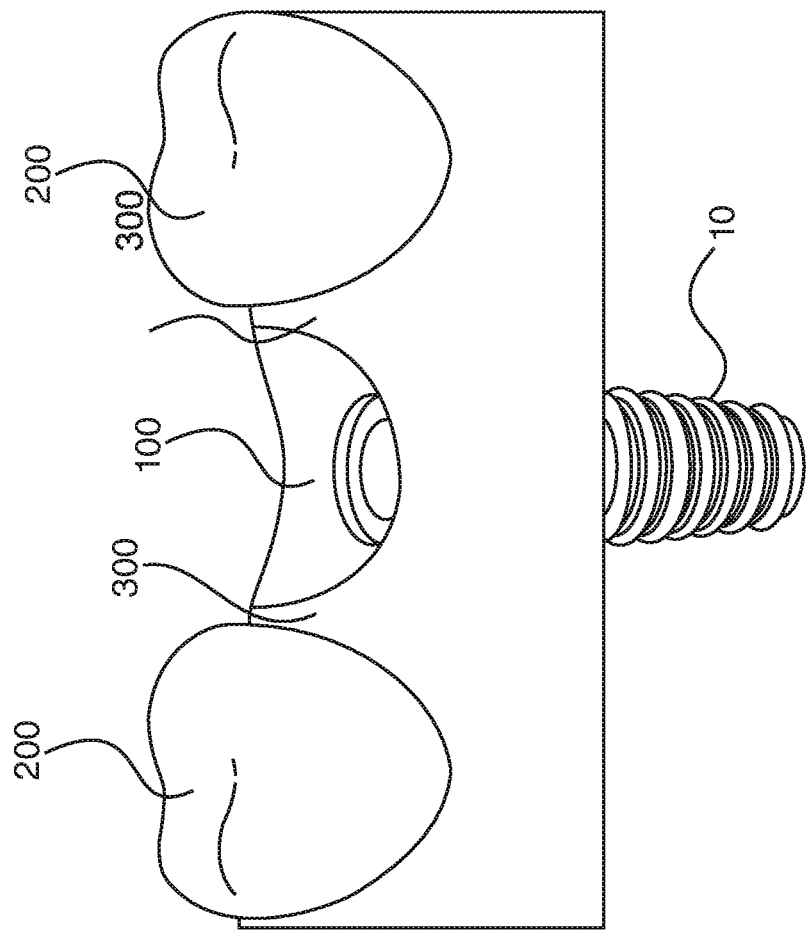

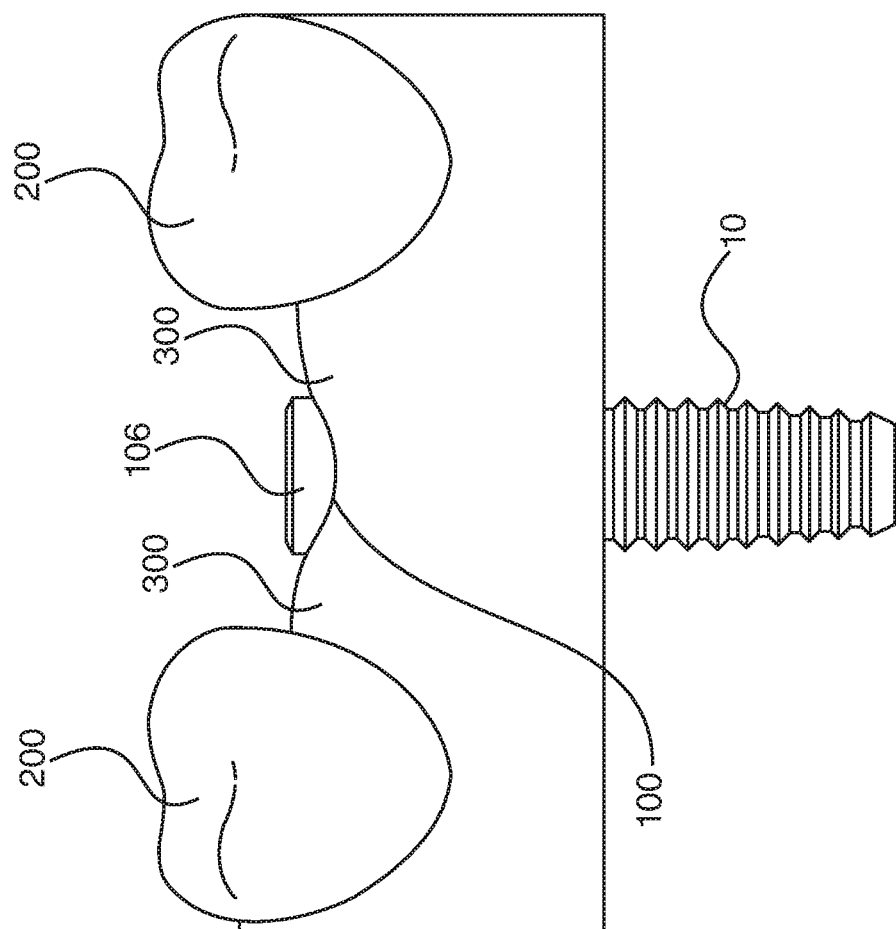

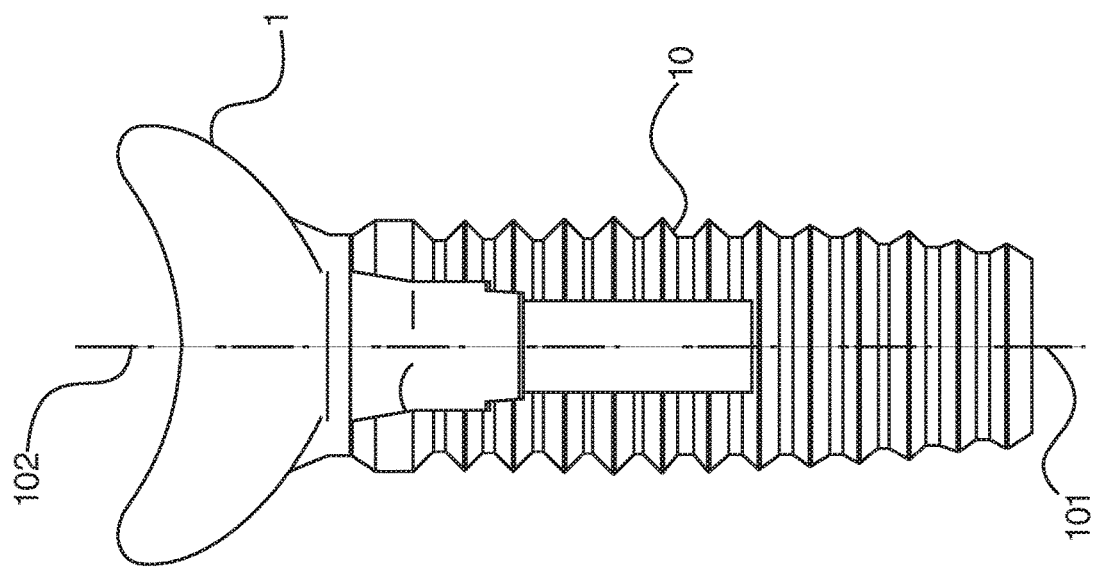

HEALING ABUTMENT SYSTEM FOR CONFIGURING CROWN ABUTMENTS AT AN IMPLANT SITE

PRIORITY INFORMATION

The present application claims priority as a continuing patent application of U.S. patent application Ser. No. 16/292,775, filed on Mar. 5, 2019, which claims priority from US Provisional Application No: 62/760,985, filed on Nov. 14, 2018; and, US Provisional Application No: 62/793,609, filed on Jan. 17, 2019.

FIELD OF THE INVENTION

The present invention relates in general to implant dentistry. In particular, the present invention is directed to a healing abutment system that maximizes interseptal alveolar bone height around a dental implant's most superior surface for optimizing aesthetic results in the gingiva, and using the subject healing abutment to locate and configure a crown, or other prosthetic, abutment, for optimum fit and anesthetics at the implant site.

BACKGROUND ART

The success of implant dentistry was vastly improved by the incorporation of osseointegration. Osseointegration was originally discovered by Dr. P. Branemark in the 1950s and 1960's using titanium implants. Dr. Branemark, an orthopedic surgeon, discovered that when titanium was implanted into bone, the two substances fused safely and securely. This appeared to provide a permanent solution to the old problem of replacing missing teeth with a durable, stable substitute for the original tooth.

However, what has been proven over time is that intimate bony contact with the dental implant is not the only condition for dental implant success. Bony anatomy at the superior aspect of the dental implant where it meets the eventual dental restoration or prosthesis is also very critical for dental implant success. Dental implant art continues to go through many modifications and evolutions in an attempt to maximize dental implant success, including aesthetic factors.

The result of more than a half century of development is a standardized set of implant hardware, and techniques for using that hardware. Dental implants and their accompanying extensions and abutments have a wide range of different shapes and designs. Examples are manufactured by Nobel Biocare, Strauman, Zimmer Biomet, BioHoizons, Implant Direct, and a number of others. Practitioners in this particular field are well aware of all the aforementioned hardware produced so that no additional elaboration is needed for an understanding of the background of this invention. Primers on implants are cited in the Information Disclosure Statements.

Historically, dental implants were placed in a surgical staged approach (two stages). The first surgical stage consisted of making an incision in the gingival tissue and reflecting the gingival tissue to the buccal and lingual to expose the alveolar bone. An osteotomy (hole to receive the dental implant fixture) would then be created in an increasing diameter stepwise fashion using a dental drill with low speed, high torque and irrigation. The dental implant fixture (implant) would then be screwed or pressed into the osteotomy and the gingival tissue would be reapproximated and sutured closed.

After a healing period of two to six months, the second stage surgical procedure would be performed at which time a small flap or hole punch would be used to create a hole in the gingival tissue through which a healing collar (healing abutment) would be placed. The gingival tissue would then heal around the healing collar for two to four weeks, at which time the artificial tooth (crown) would be fabricated and placed by screwing or cementing it to the dental implant final abutment.

A key development in the implant art is the anti-rotational connection between the dental implant fixture embedded in the bone at the missing tooth or extraction site and the final abutment (which holds the prosthesis replacing the tooth) fixed to the implant fixture. The basic designs were developed by Niznick, and are disclosed in a plurality of patents originated by that individual. All of these patents are incorporated herein by reference, and cited in the Information Disclosure Statement.

The anti-rotational connection (for crown or prosthetic abutments) patented by Niznick is so important in this art that it has become a key hardware standard, so that its absence in modern implant treatment for partially edentulous situations virtually never occurs. Furthermore, the use of these various anti-rotational connectors determine the techniques and procedures that have also become standard in modern implant dentition. As such, further elaboration is not required.

Anti-rotational connections come in many shapes, including a hexagonal shape (by Zimmer and BioHorizons); a conical hexagon and a tri-lobed arrangement (Nobel Biocare); four-sided arrangements; and, an octagon (Strauman), as well as a number of others on the market. By preventing rotation between the permanent (or final) abutment holding the crown complex (prosthesis) to the implant fixture, a high degree of stability is achieved.

Because of the reliability provided by such standard procedures and hardware, a great deal of modern implant dentition can now be directed to aesthetics, and efficiency in conducting the overall replacement process (to prevent unnecessary discomfort to the patient). The overall process steps and armamentarium, from tooth extraction to placement of the final prosthesis at the edentulous site are crucial in that they determine the overall efficiency and pace of the surgical procedure (including patient discomfort), and most importantly the aesthetic characteristics of the final prosthesis and the surrounding anatomy.

More recent developments in the procedures by which dental implants are placed include performing both the first and second stage surgical procedures at one time (single stage implant surgery), and immediate placement of dental implants after tooth extraction. Single stage dental implant surgery can be described as placing the dental implant fixture and healing abutment or collar at the same time. The advantage of this is that the patient only has to go through one surgical procedure, thereby saving time and inconvenience for the patient.

Conventional healing collars were developed to better facilitate the second stage of the surgical process. This includes the insertion of the healing abutment into the implant through partially healed gingiva to guide the contouring of the gingiva. To facilitate this, conventional healing abutments have always been circular in cross section, and have always been rotatable to screw into the implant. This was done to create as little trauma as possible to the partially healed gingiva. Despite the convenience of using a circular healing collar in single stage surgery, there are both esthetic and mechanical drawbacks.

A major disadvantage to the use of conventional, circular healing collars is that maturation of the gingival tissue around a conventional circular cross-sectional (in the horizontal plane) healing collar, heals in a non-anatomic shape. This situation can make the placement of the final crown more difficult. As the gingival tissue matures in a non-anatomic shape it is less resilient to the outward pressure of the final crown's (prosthetic tooth) greater overall dimension and different shape, which can cause a mismatch between gingiva and crown. This can hinder the complete seating (cementation or screw fixation) of the final crown.

This situation can cause the crown to be incompletely connected onto the abutment, therefore requiring reduction of the crown's occlusal surface or resulting in open regions between the abutment and crown interface. Open regions between the abutment and crown can cause cement extrusion into the surgical site resulting in an inflammatory tissue response, compromised healing and alveolar bone loss. Both stability and aesthetics can be compromised. This can be exacerbated by inaccurate placement of the crown abutment with respect to the connection axis of the implant.

A disadvantage of immediate dental implant placement after tooth extraction is the possibility of initial reduced stability of the implant fixture due to the implant osteotomy not having the same shape as the tooth root socket. To address this, bone graft materials are often placed within the tooth root socket around the dental implant fixture to help bone completely form around the dental implant fixture. With lack of gingival tissue to help retain the bone graft, the graft can become unstable. A conventional circular healing abutment does not allow for complete occlusion of the gingival opening and stabilization of the bone graft. This also adds to the difficulty of fitting a crown abutment to the implant site.

Membranes made of different materials have been used in the past to attempt to stabilize bone graft materials. However, their lack of rigidity can also lead to bone graft instability. This lack of bone graft stability can lead to loss of the bone graft and non-ideal alveolar bone anatomy. Non-ideal alveolar bone anatomy around a dental implant will ultimately lead to displeasing aesthetic results.

In modern implant dentistry, the aesthetics of the implant site and the surrounding tissue have become paramount. The conventional art regarding healing abutments focuses largely on maintaining a gingival opening for the tooth restoration to traverse through. Conventional healing abutments have been designed with a circular cross sectional configuration so as to create a gingival opening to accept the restoration hardware (crown and holding abutment). Conventionally, there is a wide range of sizes and shapes available that create a circular cross sectional opening within the gingiva. Such systems have only occasionally been successful in contouring gingiva, and providing acceptable final aesthetic results.

Custom made temporary prostheses have also been used but are labor intensive, take multiple appointments, and do not contour, contain, and stabilize bone graft materials. These temporary prostheses are usually fabricated to gradually increase in size with the attempt to contour the gingival tissue over time. This approach can be very time consuming, expensive for the patient, and only addresses the gingival tissue.

History has shown that favorable final aesthetics is directly related to the shape of the gingival anatomy and shape of the interdental gingival papilla.

Numerous studies (Tarnow, Salama, and the like) have shown that the final anatomic shape and appearance of the interdental papilla is directly affected by the height of the alveolar crestal bone and its distance from the interproximal contact point of the two adjacent tooth crowns. These studies are incorporated herein by reference.

It has been shown that the distance from the height of the alveolar crestal bone to the contact point can determine whether or not the interdental gingival papilla between the crowns will appear anatomically correct. If the distance between the two landmarks is less than the recommended guidelines, the practitioner can be relatively certain that the interdental papilla will fill the space between the tooth crowns leading to favorable aesthetics. If the distance between the landmarks is greater than the recommended guidelines then the probability for incomplete presence of the interdental papilla increases and esthetics becomes less favorable. However, conventional techniques have proven unreliable in controlling the desired contouring of gingiva.

These drawbacks of conventional implant dentition have been addressed by the anatomical healing abutment system of U.S. Pat. No. 8,382,477, issued Feb. 26, 2013, to the instant inventor. This system optimizes both the mechanics and the aesthetics of bone graft contouring and the resulting gingiva configuration. These benefits result from the anatomical healing abutments shaping qualities, both with and without concavities for bone graft material. Unfortunately, there still remain flaws in conventional implant dentition with regard to matching a crown, or other prosthetic abutment, to the complexities of the optimized gingiva configuration resulting from the subject healing abutment. This is especially true for the conventional process of fitting a crown abutment in a complex gingiva configuration which has been shaped to conform with an original tooth at the implant site.

Conventionally, in order to configure a crown abutment to the gingiva at the implant site, it is necessary to go through a number of steps. The first step is to remove the healing abutment from the implant site. This is done using the special tools included with the healing abutment kit to expose the surrounding gingiva. For the next step, an optical scan is made of the entire jaw area to obtain a gingiva profile at the implant site with respect to the rest of the mouth. This scan also provides an accurate picture of the optimized gingiva, but little more with respect to the orientation of the implant.

Next, a device known as a scan post or body (105 in FIG. 17) is inserted at the site of the implant. The scan post must be configured so as to fit onto the implant using the existing implant connection arrangements. This is necessary to provide data on the implant location, angle and connection axis. Once again, this is a time-consuming process, and can be irritating to the patient.

Another scan is then made of the jaw, gingiva and scan post. This is done to provide the correct orientation of the axis of connection of the implant so that the crown abutment can be properly oriented with respect to the rest of the jaw when the crown abutment connects to the implant. After the second scan is completed, the scan post is removed and the healing abutment replaced.

The aforesaid process can often prove to be tedious to both the practitioner and the patient. The use of the scan post, along with two scans (rather than one), is time-consuming and expensive. Nonetheless, the use of this process is absolutely necessary for creating optimal aesthetic prosthetics, such as crowns. Another complication is that the scanning systems provided by different commercial entities use different types of scanning bodies or posts. The use of these different devices complicates the process for the practitioner, who must adapt to different sizes, shapes and configurations of scanning bodies and posts. This adds to the time spent by the practitioner and the inconvenience suffered by the patient.

All of the aforementioned data (an accurate depiction of the gingiva, the details of the implant, and their relationship to the rest of the jaw and associated dentition) are absolutely necessary to create virtual models of any proposed prosthetic device and its abutment. This means that there are two major issues to consider: the precise fitting of the abutment and the crown thereon; and, the overall aesthetic appeal of the combined crown and abutment. To obtain the best aesthetic determination for crown appearance, it is helpful to have a modeling system that can provide a wide variety of different proposed crown shapes.

The dental practitioner can then make a determination regarding the best aesthetics that can be provided for a crown at the implant site. A crown configuration (and the correct prosthetic abutment orientation) for optimum aesthetics can be very time-consuming. Fortunately, this part of the process does not place a strain on either the practitioner or the patient since virtual modeling is used. Rather, this part of the process is carried out only after all of the data has been gathered from the patient, and the patient's time and discomfort is not an issue. Rather, it is the time spent scanning the patient's mouth, both with and without the healing abutment, and the use of the scanning post, that places a strain on both practitioner and patient. This data gathering aspect of the overall process presents the problems in crown configuration and alignment.

In the art of implant dentistry, a key goal is expediency and maximum cost-effectiveness. This cannot be properly achieved with the current techniques for measuring crown abutments, and designing crowns. Consequently, improvements in the conventional system are needed to improve the overall speed and cost-effectiveness of the measuring system for crown abutments. This must be achieved with a minimum of impact on the patient, and will require less patient time in the operatory.

SUMMARY OF THE INVENTION

It is a key object of the present invention to improve the aesthetic results of conventional implant dentistry.

It is still another object of the present invention to provide a healing abutment system that facilitates both surgical and restorative dental processes that are less uncomfortable, and less time consuming for the patent.

It is again an additional object of the present invention to provide a healing abutment system wherein prosthetic replacements for extracted teeth are accomplished more efficiently, and with improved aesthetic results, than with conventional systems.

It is an additional object of the present invention to use techniques similar to those conventionally used in order to obtain improvements in gingiva healing and aesthetic contouring over that found in the conventional art.

It is another object of the present invention to provide a key invention healing abutment system for bone contouring, containment, and stabilization.

It is a further object of the present invention to provide a healing abutment system for bone contouring, containment, and stabilization, which is more effective in contouring, containment, and stabilization of alveolar bone graft materials.

It is still a further object of the present invention to provide a healing abutment system for bone contouring, containment, and stabilization in which the process and technique of placing healing abutments are made more effective in contouring, containment, and stabilization of alveolar bone graft materials.

It is an additional object of the present invention to provide a healing abutment system for bone contouring, containment, and stabilization in which the healing abutments are made more effective in contouring surrounding gingiva.

It is yet a further object of the present invention to provide a healing abutment that enhances the efficiency of processes for addressing the aesthetics of a prosthetic device at an implant site.

It is again another object of the present invention to provide a healing abutment that facilitates the scanning operation of the implant site and the surrounding jaw structure, as well as dentition.

It is yet a further object of the present invention to provide a system for more efficiently enhancing the aesthetics of an implant site.

It is still another object of the present invention to provide a method of scanning an implant site and surrounding jaw characteristics in a manner more efficient than that provided by conventional systems.

It is again another object of the present invention to provide an enhanced system for producing crowns to be placed at an implant site.

It is again a further object of the present invention to provide a scanning system for gathering data at and around an implant site, using fewer steps than is required for conventional scanning systems.

It is again an additional object of the present invention to provide a healing abutment configured to facilitate comprehensive scanning of an implant site and provide data regarding the implant.

It is yet a further object of the present invention to provide a system using a healing abutment to facilitate the provision of optimal aesthetics to an implant site.

It is again a further object of the present invention to provide a healing abutment configured to facilitate a comprehensive scan of an implant site.

It is still another object of the present invention to provide a scanning system for implant sites that eliminates conventional scanning steps.

It is again another object of the present invention to provide a healing abutment that facilitates alignment of a future crown abutment with the connection axis of a dental implant.

It is yet a further object of the present invention to provide a virtual scanning system for fitting a crown and a crown abutment at an implant site while subjecting a patient to less time and discomfort than occurs in conventional scanning and crown placement systems.

It is again another object of the present invention to provide a scanning system which uses a healing abutment to optimize the aesthetic appearance of both the gingiva and the final crown at the implant site.

It is still another object of the present invention to provide a healing abutment that facilitates virtual modeling of crowns and crown abutments to be placed at the site of a dental implant.

It is yet a further object of the present invention to provide a healing abutment that facilitates virtual modeling of jaw, gum and dentition configurations.

It is again a further object of the present invention to provide a jaw scanning system that requires decreased patient time than is required for conventional scanning systems.

It is still another object of the present invention to provide a system for measuring for a prosthetic abutment, wherein an optimum manufacturing technique, and optimum material are utilized.

It is yet another object of the present invention to provide a prosthetic abutment measuring system in which the all characteristics of an anatomical healing abutment are exploited to obtain precise measurements for the prosthetic abutment.

These and other goals of the present invention are accomplished by an anatomical healing abutment configured to connect to a dental implant, where the dental implant has a connection axis, and is being held in a jaw osteotomy at a site of an extracted tooth. The anatomical healing abutment includes a connection portion having a connection axis, and being configured to connect with the dental implant so that the connection axis of the connection portion is aligned with the connection axis of the dental implant. The anatomical healing abutment also includes a body portion including an upper occlusion section, a front surface, a rear surface and two side surfaces, configured to create an anatomical gingiva configuration. The upper occlusion section has an upper contour including at least three reference marks configured to correlate the connection axis of the anatomical healing abutment to the dental implant connection axis.

Another embodiment of the present invention is directed to a method of fitting a prosthetic abutment for attachment to a dental implant. The process includes the step of installing an anatomical healing abutment to the dental implant along a common connection axis, wherein the anatomical healing abutment includes at least three reference marks on the upper portion thereof. The next step is to scan the site of the extracted tooth, including the anatomical healing abutment and the reference marks. With the data from the scanning, calculation is carried out to derive implant position data from the healing abutment reference marks. Also, the gingiva configuration around the healing abutment is derived from data regarding the healing abutment's size and shape that has been previously input to the system. Using the aforementioned data, a virtual image of the implant site is generated, and a virtual model of a prosthetic abutment is generated.

Another embodiment of the present invention is found in a modeling system configured to provide a virtual model of a prosthetic abutment for an implant site. The system includes at least one anatomical healing abutment located at the implant site. The anatomical healing abutment includes at least three reference marks on an upper section thereof. The system further includes a scanning arrangement configured to scan the anatomical healing abutment and the surrounding jaw structure associated with the implant site. There is also a calculating means for driving position data of the dental implant from the reference marks on the anatomical healing abutment. Also, configuration data regarding the gingiva surrounding the anatomical healing abutment is derived from a negative image of the anatomical healing abutment that has been previously input to the system. Finally, an image generating means is used to create a virtual model of a proposed prosthetic abutment configured for the implant site based upon the data input to the system.

BRIEF DESCRIPTION OF THE DRAWINGS

FIG. 14 is a side view of an anatomical healing abutment.

FIG. 15A is a perspective view depicting the gingiva configured by the anatomical healing abutment of FIG. 14.

FIG. 15B is a top perspective view of an anatomical healing abutment.

FIG. 16 depicts an implant site including a conventional round healing abutment.

FIG. 19 is a cross-sectional view of the implant of FIG. 18.

DETAILED DESCRIPTION OF THE PREFERRED EMBODIMENTS

Figure 1:
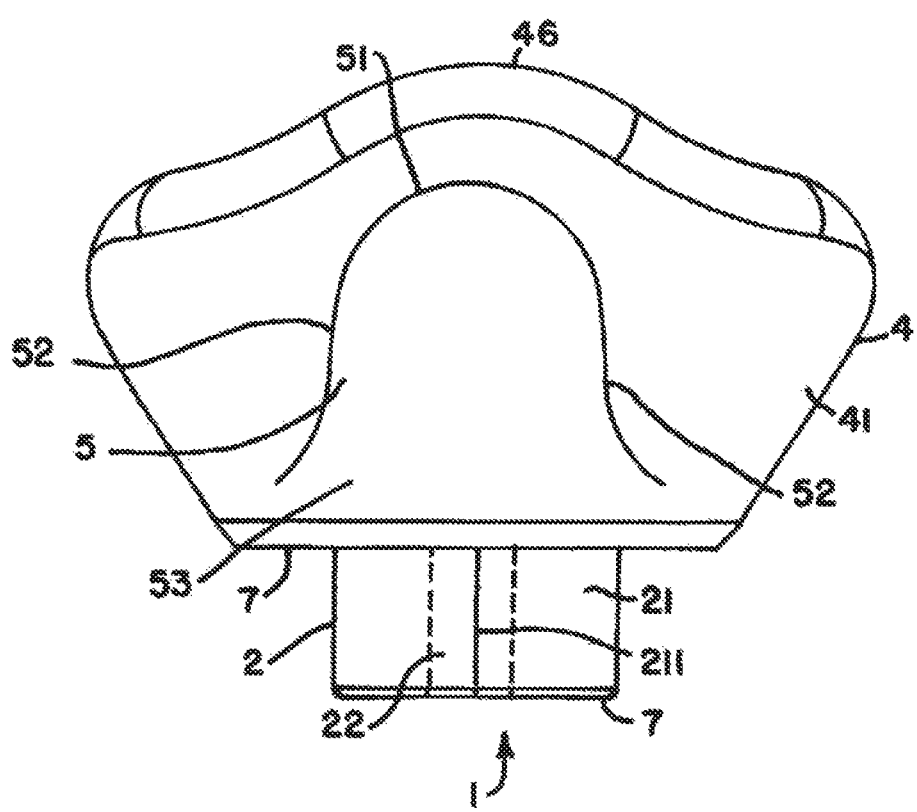
FIG. 1 is a side view of one example of an anatomical healing abutment of the present invention.
Figure 2:
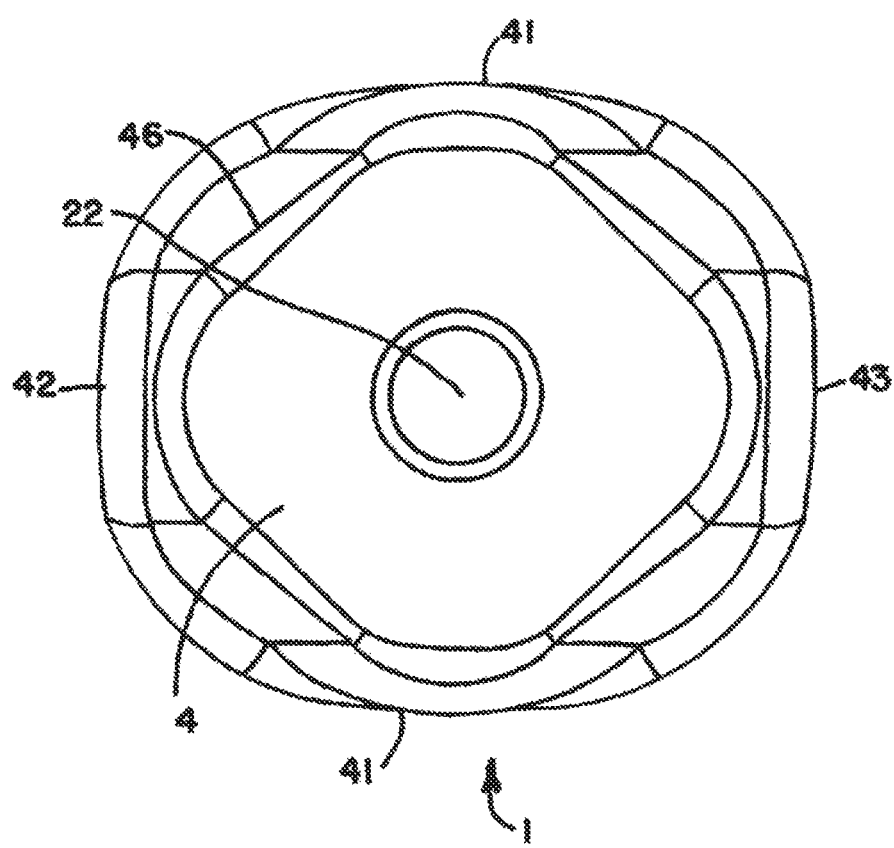
FIG. 2 is a top view of the anatomical healing abutment from FIG. 1.
Figure 3:
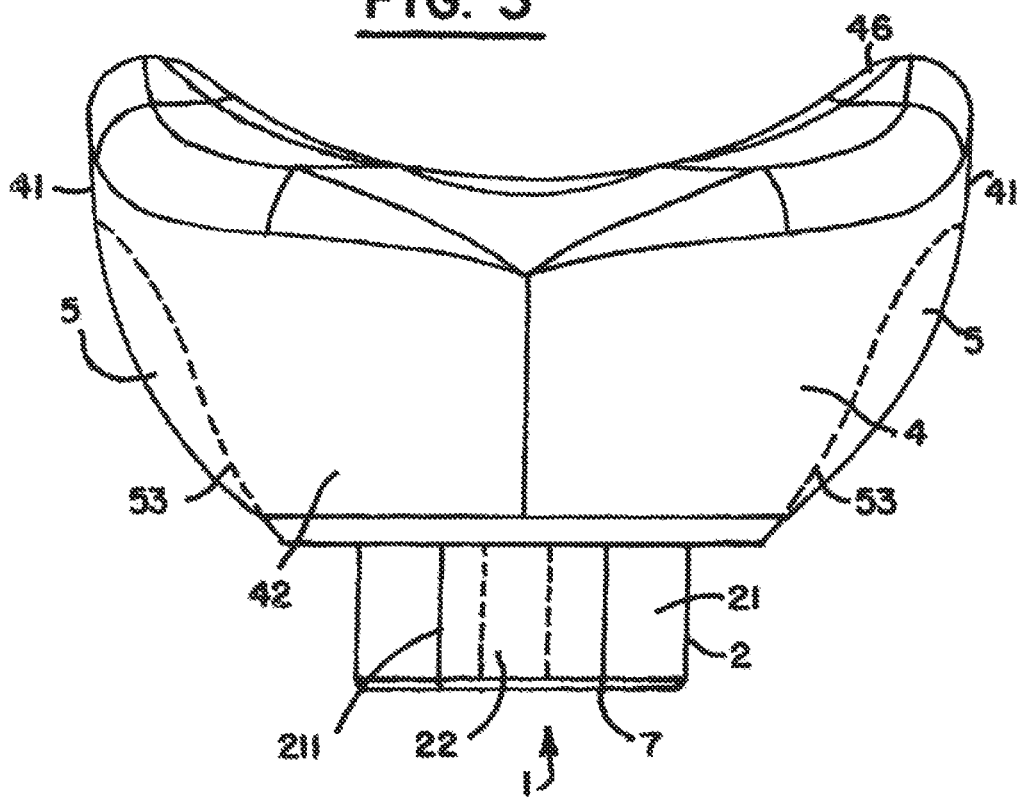
FIG. 3 is a front view (as seen looking into a patient's mouth) of the anatomical healing abutment of FIGS. 1 and 2.
Figure 4:
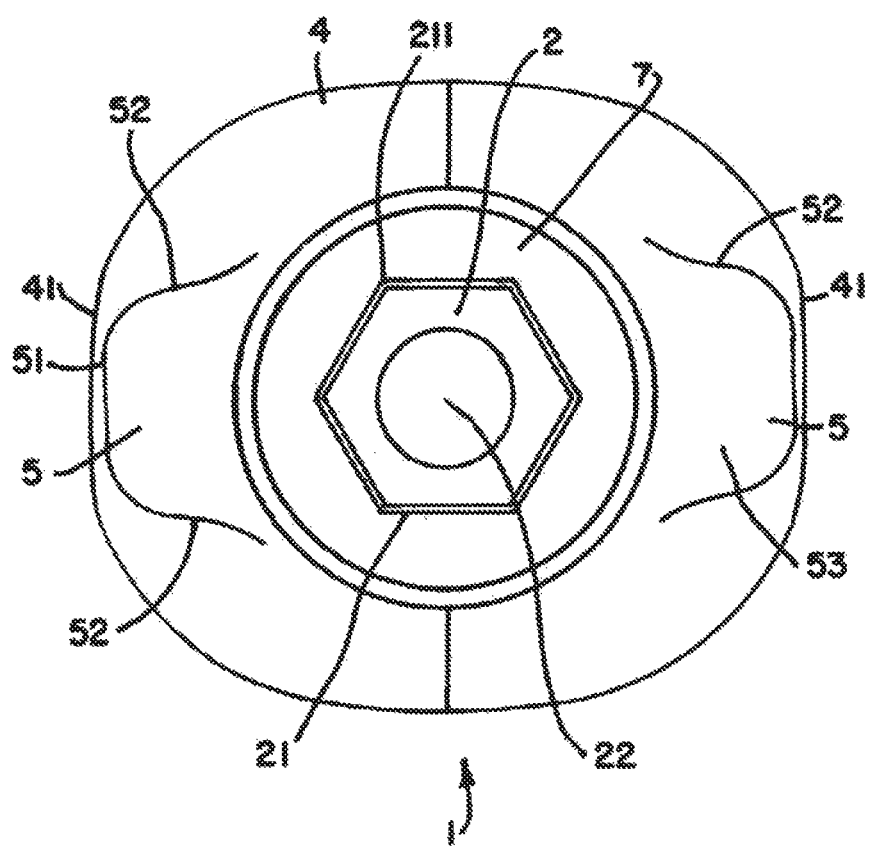
FIG. 4 is a bottom view of the anatomical healing abutment of FIGS. 1-3, depicting the mechanical arrangement for connecting to an implant (not shown).
Figure 5:
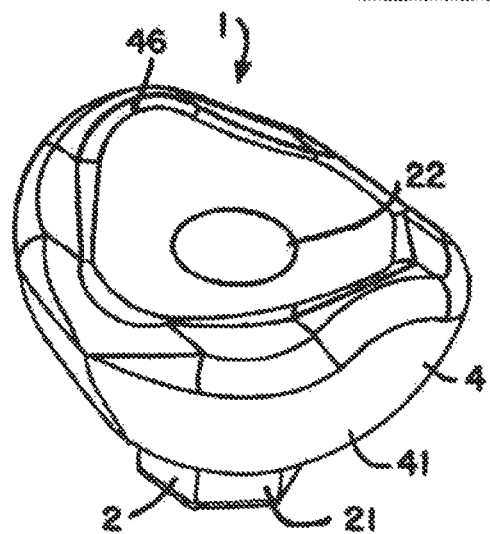
FIG. 5 is a front perspective view of the anatomical healing abutment.

The present invention operates in conjunction with the anatomical healing abutment of U.S. Pat. No. 8,382,477, to the instant inventor, and incorporated herein by reference. The subject anatomical healing abutment 1 depicted in FIGS. 1-6 of the present application is a crucial part of the current inventive system, which is directed to modeling prosthetic abutments 201 to be used at the implant site 100 were the subject anatomical healing abutment 1 has been used to configure bone graft 30 and the surrounding gingiva 300.

An anatomical healing abutment 1, such as that described in U.S. Pat. No. 8,382,477 is an integral part of the present invention. A major benefit of an anatomical healing abutment 1 is that the surrounding bone graft 30 is contoured in such a manner that the surrounding gingiva 300 is ultimately configured to resemble that around the original extracted tooth. This is considered very desirable aesthetically, which is one major goal of the present invention. Depending upon all of the circumstances for a particular extraction site, the anatomical healing abutment 1 can use the contours 5 (as depicted in FIG. 1), or not, depending upon the amount of bone graft contouring and gum configuration required for that particular site. The only requirement for the present invention is that the healing abutment 1 be anatomical in nature. The details for exact bone grafting and contouring are left to the judgment of the practitioner's evaluation of a specific extraction site.

Another major advantage of using the anatomical healing abutment 1 is that its size, shape and connection axis 102 are already well-known and contained in the database of the virtual modeling processor (via STL file transfer) used with the inventive system. Since the surrounding gingiva has already been shaped by the presence of the anatomical healing abutment, a negative image of the anatomical healing abutment will provide all the data that is necessary to obtain a true model of the surrounding gingiva. Thus, the gingiva data is already contained in the database of the present system. All of the aforementioned data is absolutely necessary to generating a virtual model (in a standard virtual modeling processor) of a proposed prosthetic abutment to be used at the site 100 of the implant 10 (where the anatomical healing abutment 1 was formally installed).

To create a virtual model of a proposed prosthetic abutment, and then a proposed prosthetic device to fit thereon, such as a crown, a full virtual image of the surrounding jaw structure is absolutely necessary. Virtual modeling allows a wide range of different proposed prosthetic abutments 201 and crowns 400 to be considered for optimum aesthetic value, as well as a proper fit at the implant site. The use of the anatomical healing abutment 1 in the present invention assures precision in the generation of virtual models for crown 400 and supporting prosthetic abutments 201.

The use of the anatomical healing abutment 1, as modified per the present invention, also provides an expedited scanning process, which is necessary to create actual virtual models of the overall implant site 100, implant 10 position, and surrounding gingiva 300 and dentition 200.

Figure 8:
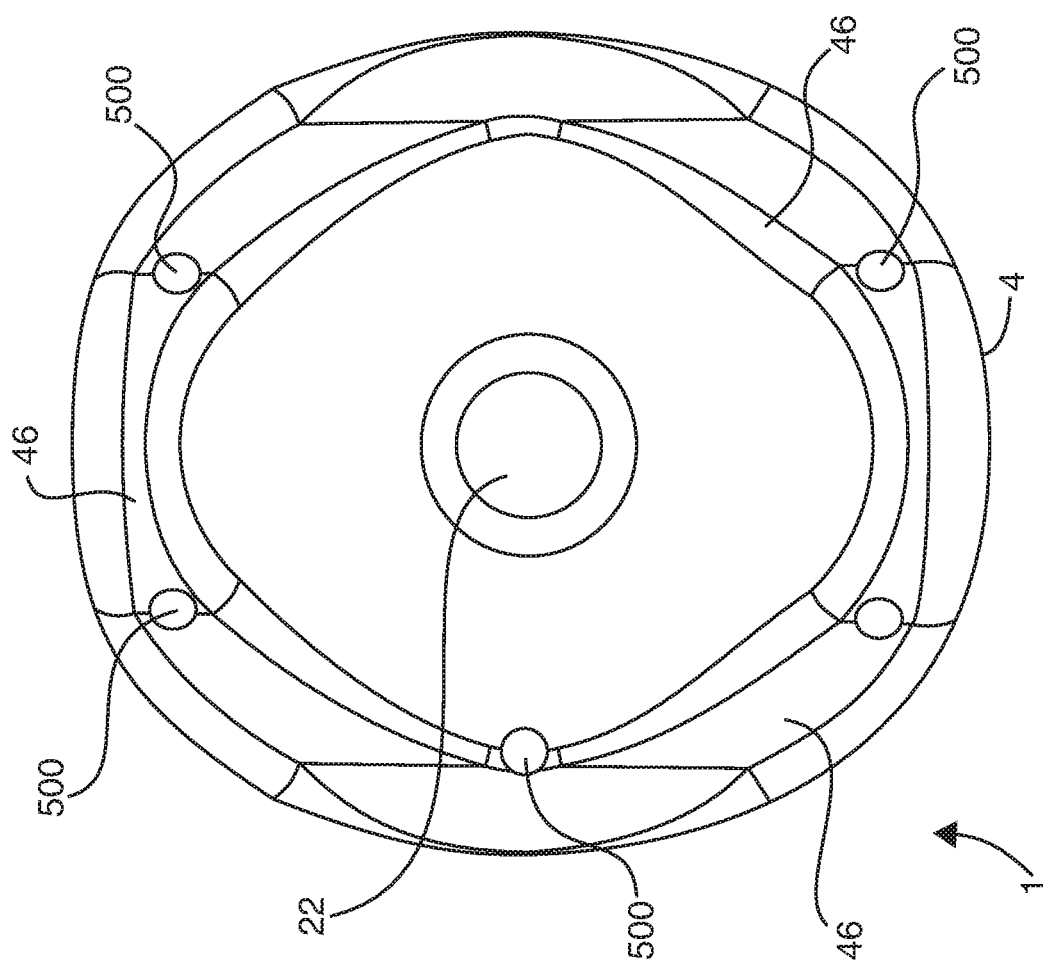
FIG. 8 is a top view of an anatomical healing abutment having five reference points.
Figure 9:
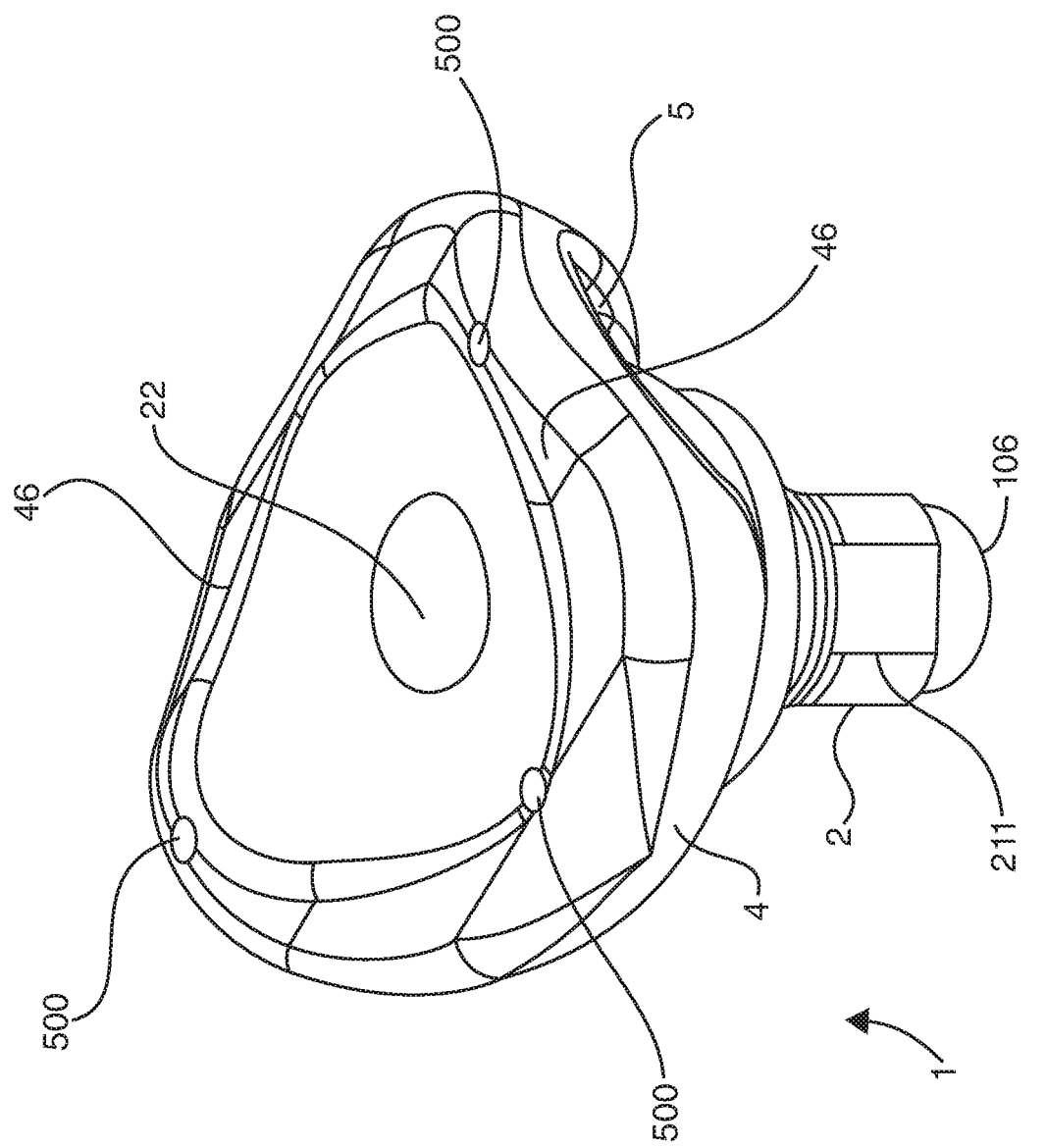
FIG. 9 is a top perspective view of an anatomical healing abutment having three reference points.
Figure 10:
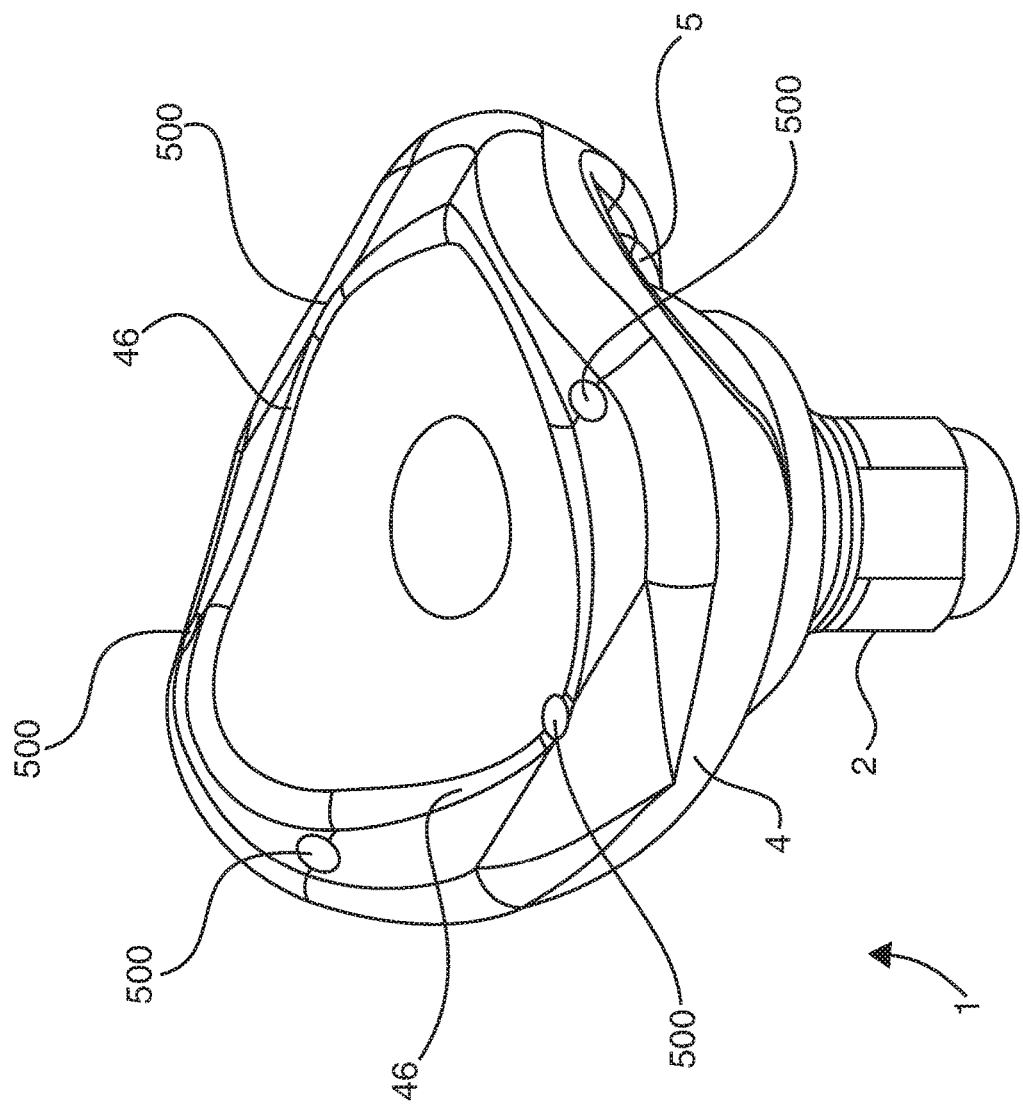
FIG. 10 is a top perspective view of an anatomical healing abutment having five reference points.
Figure 11:
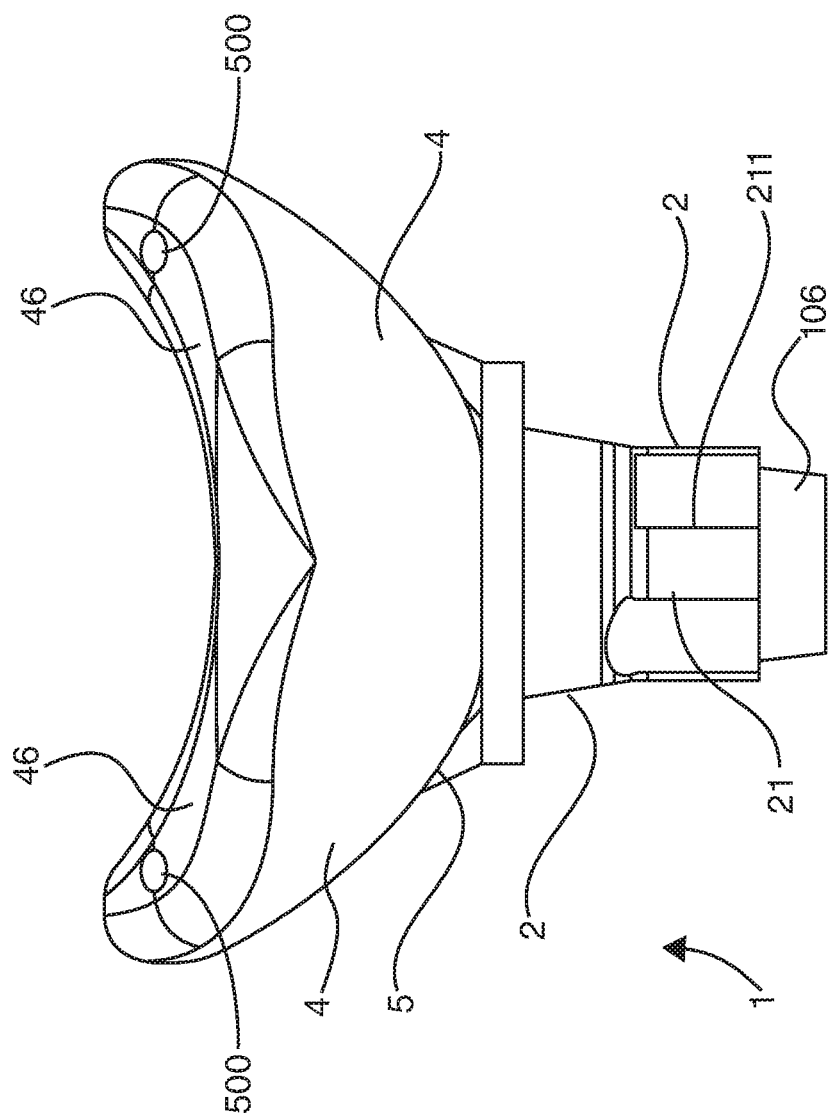
FIG. 11 is a side view of the anatomical healing abutment of FIG. 8.
Figure 12:
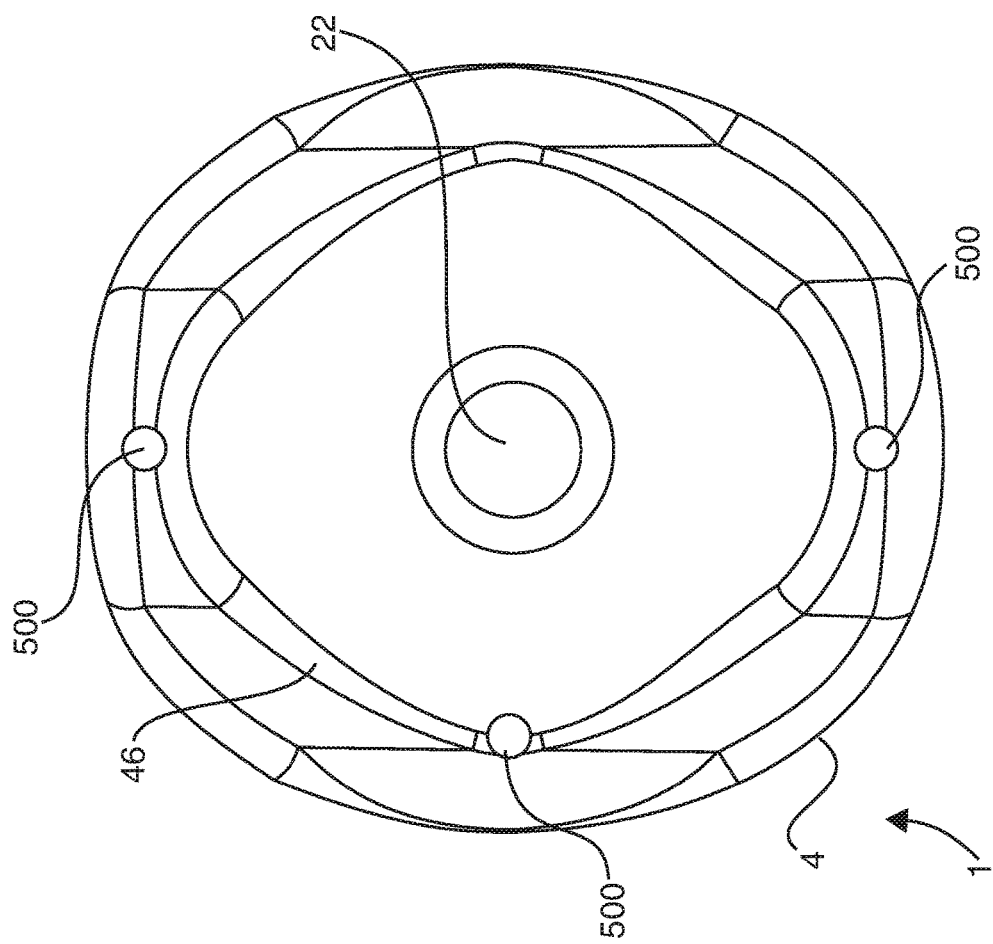
FIG. 12 is a top view of an anatomical healing abutment having three reference points.

FIGS. 8 and 12 are top views depicting an anatomical healing abutment, such as that described in U.S. Pat. No. 8,382,477, but modified in accordance with the present invention. Reference marks 500 (five in FIG. 8 and three in FIG. 12) have been added to the crown portion or upper occlusion portion 46, so that they can be readily scanned. Because of the irregular upper contour on upper occlusion section 46, reference marks 500 will not be at the same height as each other. These differences are detected by the scanning process and determine the exact position of the healing abutment 1, the healing abutment's axis of connection 102, and thus, the position of the implant 10 (via its axis of connection 101). Preferably, at least three reference marks 500 (FIG. 12) are used within the operation of the present invention. However, five or even more reference marks can be used. Further, while the reference marks 500 are shown as being circular, the reference marks need not be limited thereby. Rather, different sizes and shapes of marks can be used to further facilitate accurate location of both the anatomical healing abutment 1 and the dental implant 10.

For the sake of clarity, the same drawing designation numerals are used in the present application as have been used in U.S. Pat. No. 8,382,477. New drawing designation numerals are used to identify new elements of the present invention, such as a reference marks 500. In the present application, emphasis is placed upon elements that were not previously discussed in the subject patent, but which require additional consideration for purposes of explaining the present invention.

In particular, at connection axis 101 for the implant, and connection axis 102 for the anatomical healing abutment 1 are now important considerations, since the newly disclosed reference marks 500 relate to the position of both axes of connection 101, 102. The precise alignment of both axes of connection 101, 102 are not identified by conventional scanning techniques, but are provided by a scan of the reference marks 500 (FIGS. 8 and 12). This information is crucial in order to provide a virtual model of both the implant site 100, surrounding dentition 200, papilla 300 and all information regarding implant 10. Without all of this, a comprehensive virtual model becomes impossible, and selection and design of the proper prosthetic abutment, and later crown, become far more problematic. Conventionally, in order to provide the proper information regarding the implant and its axis of connection 101, a scanning body or post 105 is used in place of the healing abutment 1, and a second scan is made, which is then combined with a first scan. The time, effort and inconvenience to the patient caused by these additional steps are eliminated by the present invention since only the reference marks 500 need to be used in a single scan in order to identify the characteristics (including connection axis 101) of the implant 10.

It is noted that in U.S. Pat. No. 8,382,477, as well as the rest of the conventional art, the alignment of the connection axis 101 for the implant 10 and connection axis 102 for the abutment 1 is a requirement. Otherwise, a proper connection cannot be made between the two. It is the existence of this proper connection that facilitates the identification of data related to the connection axis 101 of the implant 10 to the connection axis 102 of the anatomical healing abutment 1. Once the connection axis 102 of the anatomical healing abutment 1 is identified, then the connection axis 101 of implant 10 is also known from a single scan. The necessity of a scanning post or body 105 is thereby eliminated by the present invention, as well as the steps necessarily inflicted on a patient in order to use the scanning post or body 105.

The relationship between reference marks 500 and the axis of connection 102 of the anatomical healing abutment 1 are contained within a database that is utilized to supplement the data gathered during a scan of the implant site 100. The data relating to the connection axis 102 of the anatomical healing abutment 1, which is already derived from the location of the scanned reference marks 500 also identifies the axis of connection 101 of the implant. With this data, virtual modeling of potential prosthetic abutments 201, and later crowns 400 becomes viable with a high degree of accuracy. Without the reference marks 500, this accuracy is only possible by using additional scans and the inconvenience that goes along with a scanning post 105.

The reference marks 500 on the upper occlusion section 46, of anatomical healing abutment 1 are the key to the success of the present invention. While a minimum of three reference marks 500 (FIG. 12) are necessary for the operation of the present invention, a wide variety of shapes, sizes and configurations of reference marks can be used, depending upon the size and shape of the anatomical healing abutment 1 required.

A major benefit of the present invention is the use of a single scan to obtain all the necessary information in order to begin virtual modeling of appropriate prosthetic abutments (to replace the existing anatomical healing abutment 1). The same virtual modeling process can also be extended to include future crowns such as 400 in FIG. 6.

FIGS. 8-12 depict anatomical healing abutments 1, emphasizing the upper occlusion section 46, depicting two preferred embodiments of the present invention. However, more embodiments of the present invention are contemplated by way of more than five reference marks 500, with varying patterns, configuration and mark types to provide greater facility during the scanning operation. It is noted that with the present invention, a wide variety of different marking patterns is possible.

Figure 6:
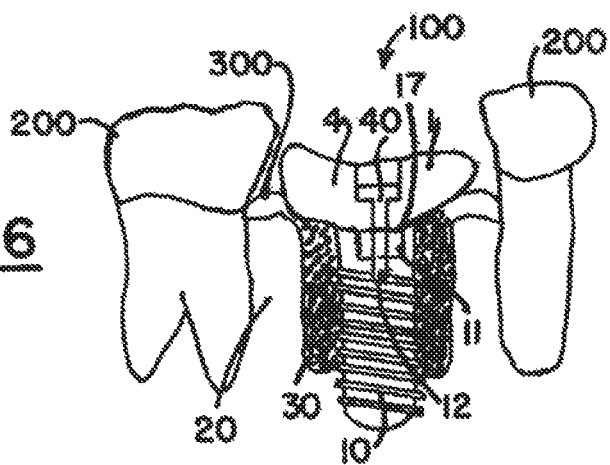
FIG. 6 is a front view of a dental implant site, in a jaw, between two existing teeth.
Figure 7:
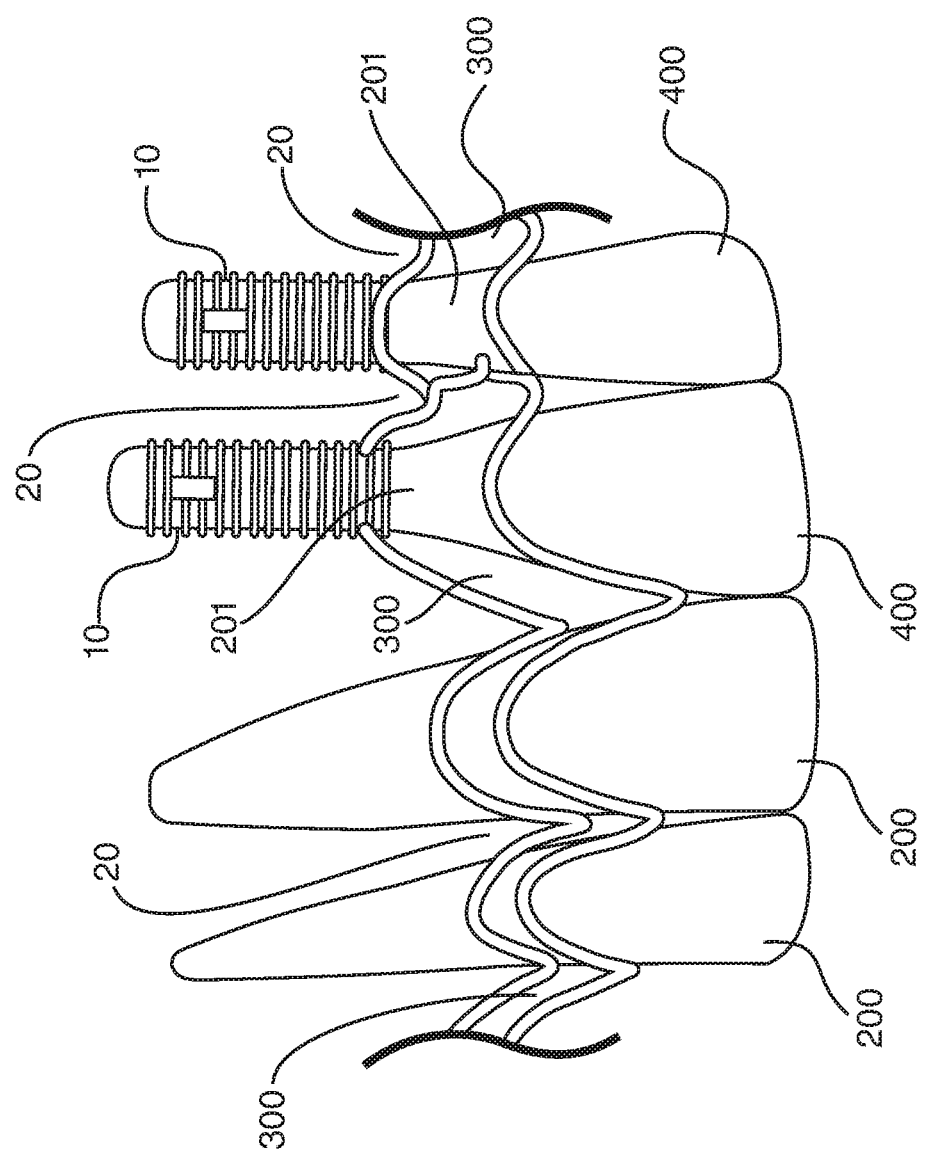
FIG. 7 is a front view of a jaw with dental implants having prosthetic devices, alongside natural teeth, illustrating key interseptal contact points.

The present invention is directed to a complex configuration of gingiva or papilla 300 as depicted in FIGS. 6 and 7. An anatomical healing abutment 1, such as that described in U.S. Pat. No. 8,382,477, renders the process and a system of the present invention necessary for expeditious scanning of an implant site 111 for purposes of configuring a future prosthetic abutment 102. Compared to an implant site that has been configured by an anatomical healing abutment 1 (such as that depicted in FIGS. 6 and 7), an implant site for which a round conventional healing abutment 106 has been used, the gingiva is relatively non-configured.

Figure 13:
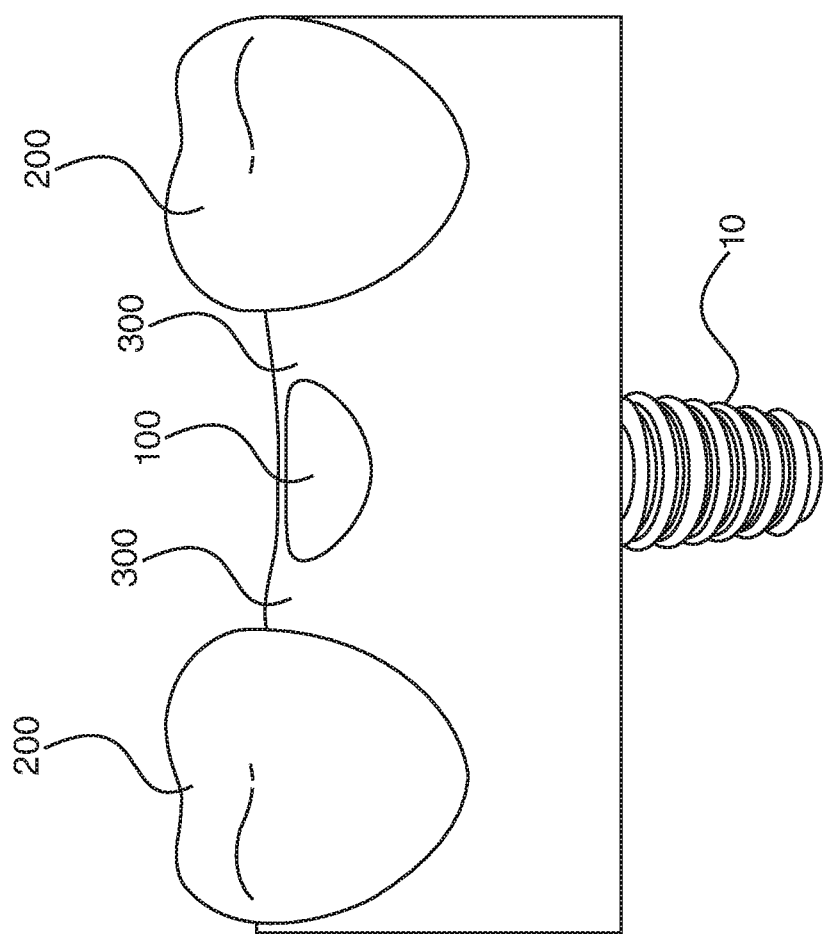
FIG. 13 is a top perspective view of an implant site, with the gingival tissue configured by a conventional round healing abutment.

The arrangement in FIG. 13 illustrates a general lack of gingiva 300 contouring found with non-anatomical healing abutments 106. Such a configuration is relatively easy to measure when configuring a future prosthetic abutment 201 for that particular implant site 100. However, as previously discussed in the present application, and in U.S. Pat. No. 8,382,477, the resulting combination of gingiva and prosthetic abutment at such a site is relatively unappealing in appearance.

FIG. 14 is a generalized representation of FIGS. 6 and 7, depicting the use of an anatomical healing abutment 1. The use of such a device configures the gingiva 300 surrounded the anatomical healing abutment by means of configuring a bone graft 30 around the anatomical healing abutment 1. This creates a far better aesthetic aspect at the implant site 100. However, it does complicate the process of fitting a proper prosthetic abutment 201 to maximize the aesthetics at the site. This is the result of the gingiva 301 being far more complex than that found at the site at which a conventional rounded healing abutment is used (FIG. 13).

FIG. 15A depicts a generalized version of an implant site 100 on which an anatomical healing abutment 1 has been used. The gingiva 300 at the site is far more complex, requiring very precise measurements, and conventionally, an additional scanning operation. The present invention avoids this through use of an anatomical healing abutment 1, such as of that depicted in FIGS. 1-7, and a particular process for measuring for the prosthetic abutment 201. The anatomical healing abutment 1, and the process together constitute a system for measuring that is superior in speed and patient convenience to that of conventional systems.

It is noted that conventional systems for measuring for a prosthetic abutment (and a crown) for an implant site 100 require the use of two scanning operations. The first scan is of the overall site. A second scan takes place when a scanning body or post is connected to the implant 10 in the same manner as the healing abutment 1, replacing the healing abutment. The first conventional scan is to provide an overall view of the implant site 100 and any surrounding dentition 200, 400.

The second scan is used to locate the axis of connection 100 for implant 10. Conventionally, this cannot be done with the conventional healing abutment in place. Nor can it be done using an anatomical healing abutment without the improvement of the reference marks 500 provided in the present invention. Then, scanning post 105, as depicted in FIG. 16, provides the exact location of the axis of connection 101 for implant 10.

In conventional systems, this data is fed into modeling software that generates virtual images to be configured for implant site 100. Such images represent models that can be manufactured to fit into implant site 100, and are oriented so that the best aesthetic appearance of the future prosthetic abutment 201 matches the axis of connection 101 of implant 10.

The present invention also facilitates the generation of virtual models or images of proposed prosthetic abutments. Further, the system of the present invention provides the necessary data for the axis of connection 101 for the implant 10 with only a single scan of the implant site 101 (and surrounding gingiva 300 and dentition 200, 400).

Figure 17:
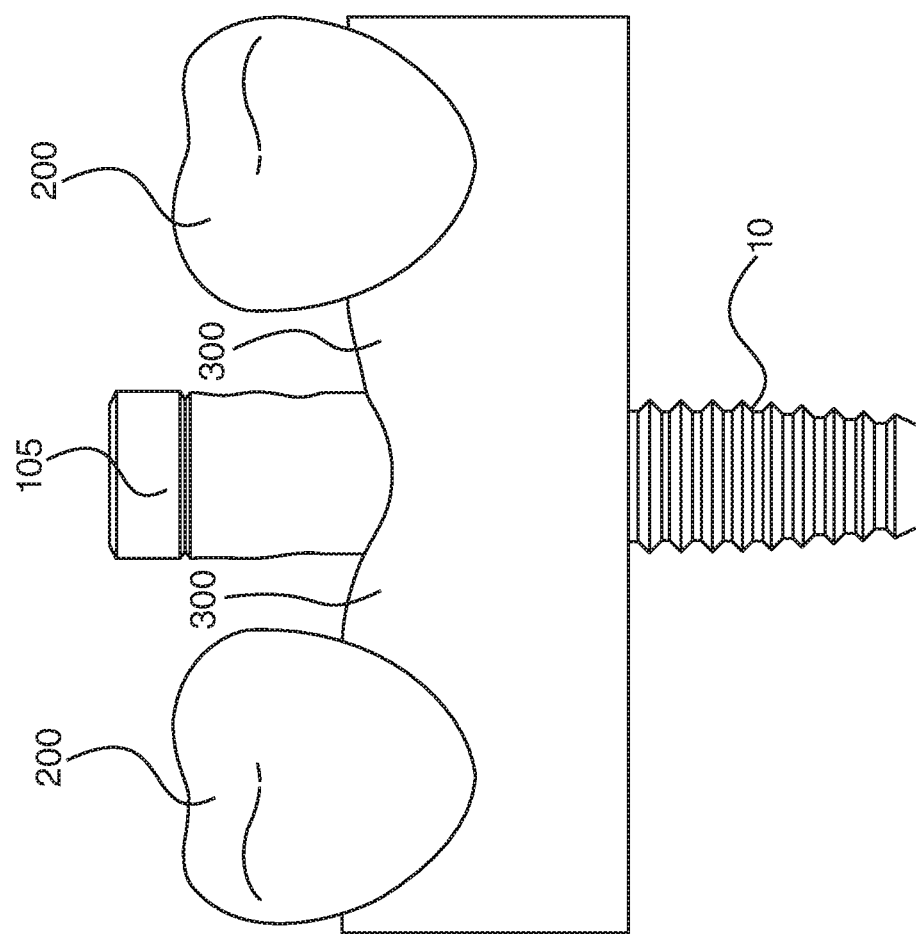
FIG. 17 depicts the implant site of FIG. 16, with the round conventional healing abutment removed and a scanning post provided in its place.

FIG. 17 depicts scanning body or post 105 connected implant 10. If scanning post 105 can be connected directly to the implant, then the conventional process can proceed. If not, other arrangements have to be made to connect the scanning post 105 to implant 10. The use of scanning posts 105 are further complicated by the providers of different scanning systems that are currently on the market. Different providers have different sizes and shapes of scanning posts, some of which can be difficult to fit onto a standard dental implant 10. These difficulties are not limited to the necessity of individual practitioners getting used to different scanning post designs. Rather, with conventional systems, the awkwardness of different types of scanning posts are also inflicted upon the client by way of additional time and discomfort endured. This is all eliminated by the system of the present invention, which eliminates the use of scanning posts altogether.

Figure 18:
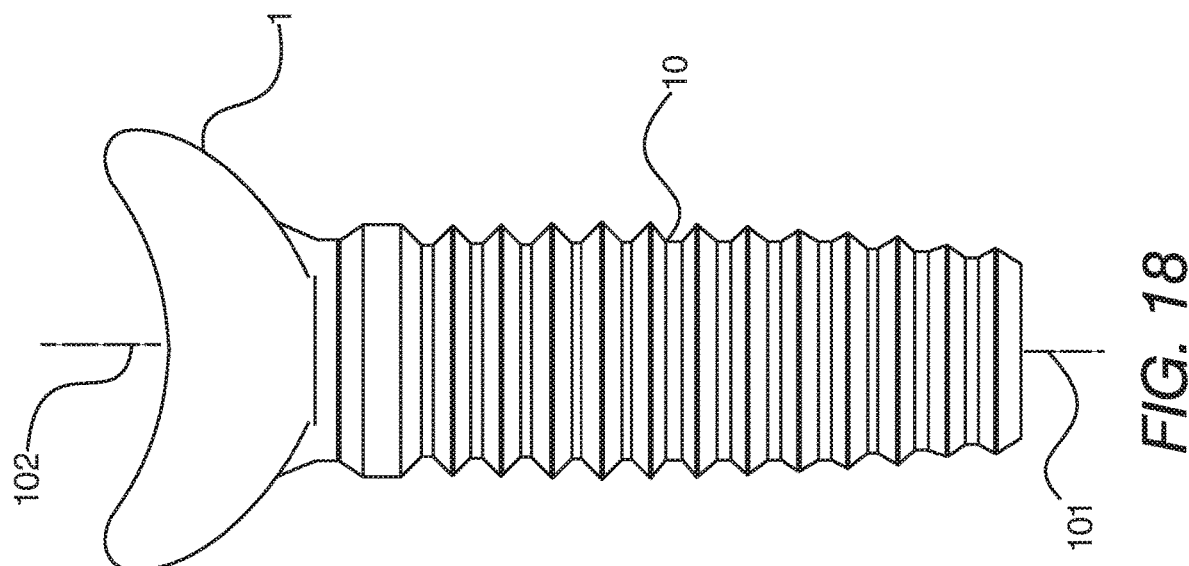
FIG. 18 is a side view of a dental implant with an anatomical healing abutment mounted thereon.

The present invention avoids the complications of the scanning post or body 105 because a single scan takes place with the anatomical healing abutment 1 in place. There is no reason to move the anatomical healing abutment 1 until it is time to replace it with a permanent prosthetic abutment 201 and crown 400. Because the anatomical healing abutment 1 does not have to be removed for a second scan, it can remain in place as depicted in FIG. 18.

This is a major convenience for both the patient and the practitioner. After all, when removing a healing abutment from an implant, the patient must tolerate the procedure and the time spent thereon. Further, any additional device, such as scanning post 105, must have its axis of connection aligning with the axis of connection 101 of the implant 10 so that there is a connection such as that shown in FIG. 19. Aligning axes of connection can be problematical, especially if multiple insertions and removals are necessary. It should be remembered that reinserting any kind of abutment into implant 10 can be awkward and time-consuming since the axis of connection 102 of the abutment must line up perfectly with axis of connection 101 of the implant, as depicted in FIG. 19. The present invention eliminates the removal and reinsertion of the healing abutment, as well as the insertion and removal of scanning post 105 during the measuring process for future prosthetic abutments and crowns.

Consequently, the steps of the present invention are much reduced from those of conventional systems. A single scan takes place. This scan is able to gather the information of the gingiva 300 at the implant site 100, as well as data on the surrounding dentition 200 around the implant site. Further, the first scan gathers the information of the axis of connection 101 of the implant 10, and integrates it with all the other data. An accurate virtual model of the gingiva 300 surrounding anatomical healing abutment 1 is provided by a negative image of the healing abutment since the gingiva grows closely around, and is configured to the anatomical healing abutment 1. Generating a negative image of a known healing abutment is easy, and can be integrated with all of the other data gathered during the single scan. All data regarding the anatomical healing abutment 1 can easily be entered into any virtual modeling system using STL files, such as those used in the creation of the original anatomical healing abutment. These files also include the relationship between the reference marks 100 and the connection axis 102 of the anatomical healing abutment 1. This data is integrated with the data input from the single scan required so that a wide range of virtual models for proposed prosthetic abutments can be considered for accurate placement at the implant site 100.

As a result, all the data necessary for generating a virtual model is collected in a single scan. From this point, virtual imaging of perspective prosthetic abutments that will fit to the implant 10 can be computer-generated in a standard fashion. Likewise, crowns that can be matched aesthetically to the surrounding dentition 200 can also be virtually generated using standard techniques. Once the best aesthetic models of both prosthetic abutment and the crown have been virtually generated and selected for optimum aesthetics, manufacturing can be carried out. The virtual model of the selected proposed prosthetic abutment 201 can be expressed as an STL file, and input into a manufacturing system. Such a system can include milling machines and 3-D printers capable of using any materials that are appropriate for use as a permanent prosthetic abutment. In the same manner, virtual models of crowns can be configured, and an optimal crown design selected. These can also be input by way of STL file into appropriate manufacturing systems.

The present invention is adaptable to current hardware and software configurations. In particular, standard scanners can be used. Examples of standard intraoral scanners are made by 3shape; Carestream 3600; Dental Wings; and, Medit i500. Of course, other scanner manufacturers can be used with the present invention. The key with the present invention is that only a single scan need be taken, rather than the multiple scans of the conventional art.

Likewise, implant treatment planning systems and software can be used in the same manner as is done in the conventional art. The conventional systems are modified only by the additional data that is input in accordance with the concepts of the present invention. Examples of implant treatment planning systems are provided by 3shape; Anatamage; 360 Imaging; and 3D Diagnostics. Each of these systems is capable of reading the position of the reference marks 500 on the anatomical healing abutment 1 when the scan of the anatomical healing abutment and the surrounding jaw structure and then dentition is made. It should be noted that other types of implant treatment planning software can be used if they accommodate the import of the anatomical healing abutment data relating the axes of connection to the position of the reference marks. The integration of the present invention with existing systems is one of the major advantages of the present invention since brand-new scanners and imaging systems for planning crowns and crown abutments are not necessary.

Another advantage of the present invention is that a restorative dentist, treating a patient using the present invention, need not take an impression of the implant site. The exclusion of this necessary conventional step saves at least five steps from the conventional procedure, and at least one patient appointment. With the present invention, the final crown and its prosthetic abutment can be sent as a unit to the general dentist. These are then connected to the dental implant 10 upon removal of the anatomical healing abutment 1, all without additional procedural steps that are required conventionally. The general dentist need take no measurements and make no adjustments.

It is noted that many manufacturing systems need take only the selected virtual model from a virtual imaging system, and carry out manufacturing (either by milling, or 3-D generation) to provide the selected prosthetic abutment and crown. All of this is done with the minimum of inconvenience to both the patient and the practitioner.

3-D generation is one preferred method of manufacturing the anatomical healing abutment of the present invention. Equally important is the type of material that is used. One preferred material for the present invention is the E-Shell 200 series low-viscosity, liquid photopolymerizable, made by Envision TEC. However, other E-shell materials can also be used when appropriate. This material is FDA approved, and has been used for hearing aid applications. Its use in dental applications is one aspect of one embodiment of the present application.

While a number of embodiments have been described by way of example, the present invention is not limited thereto. Rather, the present invention should be interpreted to include any and all variations, modifications, derivations, and embodiments that would occur to one skilled in this technology and in possession of the knowledge of the present invention. Accordingly, the present invention should be understood to be limited only by the following claims.

The invention claimed is:

1. A method of configuring a future prosthetic abutment for attachment to a selected dental implant held in an osteotomy at a site of an extracted tooth, the method comprising the steps of:
   a) installing a temporary anatomical healing abutment to said dental implant at said site along a common longitudinal connection axis, said separate anatomical healing abutment comprising at least three separate substantially circular reference marks placed in a horizontally non-planar configuration on an upper portion of said healing abutment;
   b) conducting an optical scan of at least said site of said extracted tooth, including said anatomical healing abutment and said reference marks, as well as surrounding jaw structure and dentition;
   c) using a three-dimensional spatial image from said optical scan to develop a three-dimensional spatial relationship using said reference marks to correlate any of:
      i) implant position data and anatomical healing abutment position data from a scanned position of said reference marks in the three-dimensional spatial image, and
      ii) a model of gingiva at said site of said extracted tooth;
   d) combining all data relevant to said site to generate a virtual image of said implant site, surrounding gingiva and jaw structure; and,
   e) developing an image of a virtual model of a future prosthetic abutment and future prosthetic device to be placed on said dental implant as correlated to the scanned three-dimensional spatial relationship of said reference marks with respect to said site.

2. The method of claim 1, further comprising the step of:
   g) generating multiple images of virtual models of future prosthetic devices and corresponding future virtual prosthetic abutments for comparison.

3. The method of claim 2, wherein said anatomical healing abutment comprises concavities configured to facilitate collection of bone graft material.

4. The method of claim 3, wherein said position data comprises implantation depth, implantation angle, implantation position, and location of implant axis of connection.

5. The method of claim 4, wherein said anatomical healing abutment comprises at least five reference marks.

6. The method of claim 1, wherein selection of a future prosthetic device and a corresponding future prosthetic abutment require only a single scan of said site and said anatomical healing abutment.

7. The method of claim 1, wherein the selection of a future prosthetic device and a future prosthetic abutment require placement of only a single anatomical healing abutment at said implant site.

8. The method of claim 1, wherein said anatomical healing abutment comprises an upper portion having at least five separate substantially circular reference marks placed in a non-planar configuration on an upper portion of said healing abutment.

9. The method of claim 1, wherein said model of said gingiva at said extraction site is derived at least in part from a negative of an image of said anatomical healing abutment.

* * * * *